(12) United States Patent
Wienken (10) Patent No.: US 11,369,082 B2
(45) Date of Patent: Jun. 28, 2022

(54) FEEDING DEVICE FOR MALE CHICKENS

(71) Applicant: BIG DUTCHMAN INTERNATIONAL GMBH, Vechta (DE)

(72) Inventor: Eike-Steffen Wienken, Vechta (DE)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 313 days.

(21) Appl. No.: 16/347,870

(22) PCT Filed: Nov. 10, 2017

(86) PCT No.: PCT/EP2017/078891
§ 371 (c)(1),
(2) Date: May 7, 2019

(87) PCT Pub. No.: WO2018/087291
PCT Pub. Date: May 17, 2018

(65) Prior Publication Data
US 2019/0364845 A1    Dec. 5, 2019

(30) Foreign Application Priority Data

Nov. 10, 2016    (DE) .......................... 202016106300.0

(51) Int. Cl.
*A01K 5/02*    (2006.01)
*A01K 39/012*    (2006.01)

(52) U.S. Cl.
CPC .......... *A01K 5/0208* (2013.01); *A01K 39/012* (2013.01)

(58) Field of Classification Search
CPC .... A01K 5/0208; A01K 39/012; A01K 39/01; B65G 19/14; B65G 19/22; B65G 35/06; B65G 35/066
See application file for complete search history.

(56) References Cited

U.S. PATENT DOCUMENTS 2,581,725 A * 1/1952 Smallegan ............. A01K 39/01
119/58
3,159,142 A * 12/1964 Bares ................... A01K 5/0208
119/57.2

(Continued)

FOREIGN PATENT DOCUMENTS

DE        3325594        1/1985
DE     202013100686     4/2013

(Continued)

*Primary Examiner* — Monica L Barlow
*Assistant Examiner* — Brittany A Lowery
(74) *Attorney, Agent, or Firm* — Price Heneveld LLP (57) ABSTRACT

A feeding device for working animals comprises a conveyor with a plurality of receiving regions for a feed, where the receiving regions are arranged along the conveyor chain and are accessible from above for the working animals, a feed supply device for supplying feed to the receiving regions, and a guide device for guiding the conveyor along a predetermined path. The guide device guides the conveyor in a first path section of the predetermined path parallel and in a horizontal direction adjacent to a second path section of the predetermined path. The conveyor is guided in the first path section in a first conveying direction which is opposed to a second conveying direction in which the conveyor is guided in the second path section.

21 Claims, 2 Drawing Sheets

(56) References Cited

U.S. PATENT DOCUMENTS

| | | | |
|---|---|---|---|
| 3,164,245 A * | 1/1965 | Juengel | B65G 21/02 |
| | | | 198/841 |
| 3,225,895 A | 12/1965 | Reimers | |
| 3,250,250 A * | 5/1966 | Woock | A01K 39/01 |
| | | | 119/57.2 |
| 3,262,546 A | 7/1966 | Mcauley et al. | |
| 3,262,547 A | 7/1966 | Mcauley et al. | |
| 3,433,205 A * | 3/1969 | Pittard | A01K 39/01 |
| | | | 119/51.11 |
| 2016/0353713 A1 * | 12/2016 | Rust | A01K 39/02 |
| 2017/0055500 A1 * | 3/2017 | Keirse | A01K 39/01 |

FOREIGN PATENT DOCUMENTS

| | | |
|---|---|---|
| ES | 293386 | 1/1964 |
| JP | S60228311 | 11/1985 |
| WO | 2015173170 | 11/2015 |

* cited by examiner

FEEDING DEVICE FOR MALE CHICKENS

CROSS-REFERENCE TO FOREIGN PRIORITY APPLICATION

The present application claims the benefit under 35 U.S.C. §§ 119(b), 119(e), 120, and/or 365(c) of PCT/EP2017/078891 filed Nov. 10, 2017, which claims priority to German Application No. 202016106300.0 filed Nov. 10, 2016.

FIELD OF THE INVENTION

The invention relates to a feeding device for working animals, comprising: a conveyor with a plurality of receiving regions for a feed, said receiving regions being arranged along the conveyor chain and being accessible from above for the working animals, a feed supply device for supplying feed to the receiving regions, a guide device for guiding the conveyor along a predetermined path.

BACKGROUND OF THE INVENTION

Feeding devices of this type are used in order firstly to convey feed from a feed supply device and secondly to make said feed accessible to the working animals along the guide device on said conveying route. Such feeding devices therefore in particular have the advantage that, by means of the combination of conveying and accessibility, they make the feed accessible to the working animals along a great distance and consequently are suitable for carrying out simultaneous feeding of a multiplicity of working animals.

Typically, elongate and flexible distance conveyor elements are used here as the conveyor. For example, these can be conveyor chains which can be designed as link chains or the like, with special surfaces, which are effective for the conveying, on the individual chain links. Such conveyor chains are then firstly guided along a predetermined path and secondly are also moved along said path for the purpose of the conveying effect.

Conveyor screws, such as, for example, spiral springs, conveyor worms, or the like, can also be used as the conveyor and likewise require a guide for the exact positioning, but then for the conveying effect can be rotated about an axis extending along the path in order thereby to exert a screw conveying effect on the feed. This type of conveyor can accordingly also be fixed in position and the conveying effect can be brought about by rotation about the dedicated longitudinal axis, but, according to the invention, also has to be designed flexibly for a deflection. Conveyor screws of this type can alternatively also be moved along the path in order to obtain the conveying effect; in this case, the rotation of the conveyor screw or conveyor worm can be omitted.

In the case of such feeding devices, the feed used is generally feed in the form of particles, generally a dry feed, which is readily suitable both for conveying and for removal from the conveyor by the working animals. Feeding devices of this type are preferably used for feeding poultry, for example, hens or male chickens, and can then preferably extend along a residence area of the working animals in order to convey the feed along the entire region of extent and to make said feed accessible to the working animals.

Feeding devices of this design frequently have the disadvantage that they are subject to restrictions in respect of their laying along residence areas of the working animals and, as a result, may not be used or may not be readily used for a series of configurations of such residence areas. In addition, in some applications, the delivery speed of the feed constitutes a disadvantage which makes sufficient and efficient supply of the working animals with feed difficult. Although, in principle, the delivery speed can be increased by increasing the conveying speed of the conveyor, the conveyor, which then moves rapidly, makes it difficult for the working animals to remove the feed and increases the risk of injury.

The invention is, therefore, based on the object of providing a feeding device which is improved in relation to these disadvantages.

SUMMARY OF THE INVENTION

This object is achieved according to the invention by a feeding device of the type mentioned at the beginning, in which the guide device is designed to guide the conveyor in a first path section of the predetermined path parallel and in a horizontal direction adjacent to a second path section of the predetermined path, wherein the conveyor is guided in the first path section in a first conveying direction which is opposed to a second conveying direction in which the conveyor is guided in the second path section.

According to the invention, a feeding device is provided in which the conveyor is guided in two horizontally, mutually adjacent path sections opposed to each other. The conveyor preferably runs here at the same height in the first and second path section, but can also run in a height-offset manner with respect to each other. With the feeding device provided according to the invention, a more compact design and course of the conveyor is obtained than in the case of previously known feeding devices with such conveyors, in which the conveyor is guided in, for example, a rectangular path course in a spaced-apart, but non-adjacent position. It is made possible according to the invention for the working animals to remove the feed from the conveyors both in the first path section and in the second path section, which results in better accessibility to the feed for the working animals. With the feeding device according to the invention, at the same time providing the feed along a line which can be rectilinear or curved is made possible at the same time and, by this means, an overall more flexible configuration of the feed distribution, which configuration can be better used for many forms of residence areas of working animals, is made possible.

In principle, it should be understood that the conveyor is designed in such a manner that it firstly permits conveying of the feed and secondly removal of the feed by the working animals both already during the conveying and when the conveyor is at a standstill. For this purpose, the conveyor has corresponding surface portions on which the feed comes to lie or with which the feed can be pushed in the conveying direction of the conveyor. The conveyor here is preferably assembled from a multiplicity of identically designed chain links which are coupled in such a manner that the conveyor can firstly guide and secondly permits a deflection in such a manner that the conveyor can be deflected from the first path section into the second path section. The feed supply direction can be represented, in particular, in a feed line or a feed container. The feed supply direction can preferably supply the feed by means of separate conveyor means or by gravity; in particular, this can take place onto the feed chain from above, with there also being other forms of supplying the feed, for example, by conveying the feed from below into a region through which the conveyor passes or from the side into a region through which the conveyor passes.

The feed supply device here can be designed for a continuous or a periodic supply of feed.

In a simple configuration, the guide device can comprise steering assemblies for the conveyor, which steering assemblies are spaced apart from one another and are arranged, for example, at two deflecting points, between which the conveyor extends by corresponding tensioning along its course. The guide device can furthermore comprise suitable rails, conducting elements, guide rollers or the like which are located along the course of the conveyor or in individual sections along said course. In particular, the guide device can be functionally additionally designed in order to hold the feed in the region of the conveyors, for example, by the guide device being formed by lateral boundary walls which enclose the conveyor.

According to a first preferred embodiment, it is provided that the conveyor is an endless conveyor. By providing an endless conveyor, i.e., a conveyor which is self-contained, continuous operation of the conveyor circulating around corresponding deflectors can be carried out and, by this means, the arrangement according to the invention of the first and second path section can be used and passed through in a particularly efficient manner.

Even further, it is preferred if the feed supply device is designed to supply feed simultaneously into receiving regions of the conveyor in the first and in the second path section. In principle, it is possible to operate the feeding device according to the invention in such a manner that the feed is applied onto a section of the conveyor in one region and is distributed from said region. The specific arrangement and the course of the conveyor in two mutually horizontally adjacent path sections makes it possible, however, to use a single feed supply device to apply the feed to the conveyor in the first and the second path section. By this means, firstly, the volume rate with which the feed can be applied is increased, and, therefore, within a shorter period of time than previously known, a certain volume of feed can be introduced into the feeding device. In addition, by conveying the feed in the first and in the second path section in two opposed directions, the span of time in which the feed is distributed along the conveyor is considerably shortened, namely virtually halved, as a result of which the time taken for providing the feed for the working animals is shortened. Finally, a further advantage of this preferred embodiment can be seen in the fact that the distance along which the feed has to be distributed from the feed supply direction is shortened, and, therefore, the effect that, by loss or removal of feed along said distance, the feed no longer arrives in the desired quantity at a further spaced-apart location, is reduced or avoided.

It is preferred even further here if the feed supply device extends over the first and the second path section. According to this embodiment, the supply of feed is brought about by admission of the feed from above onto the conveyor in the first and the second path section, which permits an efficient, gravity-actuated supply of feed in a reliable manner.

According to a further preferred embodiment, it is provided that the first and the second path section extend over at least part of their adjacent and parallel course to a first deflector which is designed for deflecting the conveying direction of the conveyor by 180°. According to this embodiment, a compact arrangement is provided along a line of progression for the first and second path section as far as a deflector which then deflects the conveyor by 180° and, therefore, permits in particular the use of an endless conveyor for the feeding device according to the invention.

It is particularly preferred here if the first and the second path section extend over at least part of their adjacent and parallel course to a second deflector which is designed for deflecting the conveying direction of the conveyor by 180°. According to this embodiment, the first and second path section are arranged between a first and a second deflector, said deflectors in each case deflecting the conveyor by 180°, and, therefore, the entire feeding device is designed as a longitudinally extending unit along a rectilinear or curved line which includes the first and second path section between the two deflecting points and, between said two deflecting points, permits access for the working animals to the feed.

According to a further preferred embodiment, it is provided that the first deflector comprises a first deflecting element which is encircled by the conveyor over a circumferential angle of at least 180°. According to this embodiment, a deflecting element around which the conveyor circulates is provided in the deflector. Such a deflecting element can be formed by a stationary body about which the conveyor moves in a sliding manner. In particular, the deflecting element can be formed by a deflecting wheel which is mounted rotatably and, on its circumferential surface, receives and guides the conveyor in order to bring about a friction-free and low-resistance deflection of the conveyor.

It is even further preferred here if, in the first and second path section, an inner edge of the conveyor runs in mutually adjacent form in the first and second path section and the first deflecting element lies against the inner edge of the conveyor. According to this embodiment, an inner edge of the conveyor, which edge is defined as that edge which, in the adjacent region of progression of the conveyor in the first and second path section faces each other, lies against the deflecting element and is guided by the deflecting element.

It is further preferred here if the first deflector has a second deflecting element which lies against an outer edge opposite the inner edge and deflects the conveyor to an adjacent course at a distance which is smaller than the diameter of the circle which the inner edge of the conveyor passes through in the encircling of the first deflecting element. According to this embodiment, the deflecting device is formed by a first and a second deflecting element which can both be formed in the previously described embodiment by fixed elements, along which the conveyor slides, or by deflecting wheels or the like. The first deflecting element brings about the deflection of the conveyor by 180° and, during the deflecting function by itself, would thereby have an influence on the distance at which the conveyor runs in the first and second path section with respect to each other, i.e., on the neighboring distance. A second deflecting element is provided which guides the conveyor on its outer edge, i.e., those edges of the conveyor which face away from each other in the first and second path section, and thereby guides the conveyor from the spacing defined by the first deflecting element to a closer distance from each other. By means of this position of two deflecting elements, a narrow course of the conveyor in a close proximity in the first and second path section can be provided without the conveyor device for this purpose having to be deflected in the deflecting region with a correspondingly small radius which would greatly stress the conveyor mechanically. Instead, in this embodiment, the deflection at the first deflecting element can be carried out with an outside diameter which is greater than the distance between the inner edges of the conveyor in the first and second path section, and the conveyor thereby running in the deflecting region at a large distance about the first deflecting element can be guided again by the second deflecting element into a position of the conveyor more closely adjacent to each other.

Furthermore, it is preferred if the second deflector is designed in accordance with the first deflector. According to this embodiment, the functional design of the first and second deflector is identical; in particular, the first and second deflector can be formed identically, and, therefore, a universal use of said deflectors at, for example, two ends of a feed section formed by an endless conveyor is possible. The first and second deflectors can also be designed in a corresponding manner such that the first deflector is formed in a functionally identical, but mirror-symmetrical manner with respect to the second deflector, and, therefore, the use of identical components is possible, or a rotated installation position of the second deflector with respect to the first deflector meets the functional requirements at two opposite ends of a conveying section.

Even further, it is preferred if the conveyor is arranged and designed in the first and second path section for the removal of feed by the working animal. According to this embodiment, the conveyor is oriented and arranged in the first and second path section in such a manner that working animals can remove feed from the conveyor, with this being possible either with the conveyor moving or when the conveyor is at a standstill.

Even further, it is preferred if the conveyor is deflected from the first into the second path section about a vertically oriented deflecting axis. This embodiment permits a deflection of the conveyor from a first into the second path section in a horizontal plane, wherein it should also be understood under this that the conveyor undergoes a height offset during the deflection. The vertically oriented deflecting axis can be, for example, an axis of rotation of a deflecting wheel which is part of the deflector. In particular, the deflector can be formed by two deflecting wheels, the axes of which are oriented vertically. The orientation of the deflecting axis preferably also corresponds here to the direction from which the working animals can remove the feed from the conveyor.

Even further, it is preferred if the guide devices formed by a feed trough which extends along the first and second path section and encloses the first and second path section at the bottom and laterally, wherein the feed trough preferably extends along the entire course of the conveyor. According to this embodiment, the conveyor runs in a feed trough which consequently extends in elongated form along the conveying path of the conveyor. Such a feed trough can be formed by a bottom wall and side walls, and just as readily by a single curved wall or by other cross-sectional forms of such walls. In particular, both the first and the second path section can be arranged next to each other in a common feed trough, which promotes a slender and simple design. Accordingly, in this embodiment, the first path section lies next to a side wall of the feed trough, the second path section lies next to another side wall of the feed trough, and there is no side wall of the feed trough between the first and second path section. The feed trough firstly prevents losses of feed in the lateral direction with respect to the conveying movement and secondly permits the feed to be introduced from the feed supply direction and also to be temporarily stored in the feed trough so that the working animals can remove the feed from the feed trough in which the conveyor is moving. In particular, it is preferred here if the feed trough encloses the entire conveyor, i.e., even encloses possible deflectors of the conveyor, and therefore a loss of feed can be very substantially prevented.

Even further, it is preferred if the feed trough has an elevation which is arranged between the first and the second path section and extends along the path sections and which is preferably formed by a deformation of a bottom section of the feed trough. Such an elevation firstly prevents undesirable contact of the inner edges of the conveyor, which edges have a mutually opposed conveying direction and could, therefore, block the movement of the conveyor in the event of mutual contact. In addition, such an elevation avoids an undesirable shearing effect on the feed or a risk of injury to working animals gripping or picking in the intermediate space between the two conveyors. The elevation can have, in particular, a contour of triangular cross section and can extend between the first and second path section. If the feed trough is formed from a metal sheet or a plate material, the elevation can be formed by a corresponding, inwardly shaped contour, for example by deformation.

A further aspect of the invention is a feeding device of the type described previously or at the beginning, in which the conveyor is formed from a plurality of chain links which are coupled to one another, form a horizontal receiving surface for the feed and are coupled to one another for pivoting of two chain links coupled to one another about a vertically oriented pivot axis, wherein each chain link has an upwardly facing abrasive feed receiving region for receiving feed.

As explained at the beginning, a requirement imposed on such feeding devices is to provide feed in an efficient manner to working animals in the region of a residence area for said working animals. Efficient provision should be understood here as meaning that the feed firstly is provided rapidly for the working animals, i.e., can be conveyed at a high volume rate into the regions in which it can be removed by the working animals and, secondly, low losses of feed due to delivering and scattering the feed from the feeding device occurs.

It is known from WO 2015/173170 A1 to compose a conveyor, which is designed as a conveyor chain, from a multiplicity of conveyor elements, the upwardly facing surfaces of which are provided with an abrasive pattern. This is intended to render the beaks of poultry taking feed from said conveyor chain harmless and to thereby reduce the risk of injury by such beaks in animal husbandry.

A disadvantage of this type of configuration of conveyor chain links is that, by means of the abrasive configuration of the surface, the guiding of the conveyor chain cannot be carried out by hold-down clamps or other guide elements acting on the conveyor chain surface since this would firstly have the undesirable effect that particles of the guide elements could accumulate on the surface of the conveyor chain links due to the abrasive effect and would therefore be undesirably absorbed by the working animals, and, furthermore, a high degree of wear of the guide elements and a high movement resistance of the conveyor chain would be caused. Conveyor chains which are constructed in such a manner are, therefore, not suitable for pivoting the chain links about a vertical axis, the guide elements here are necessary as hold-down clamps.

However, there is a need for conveyor chains which permit such a pivoting of the conveyor chain links about a vertical axis in order thereby to be able to carry out an efficient feeding operation, for example, in the previously described manner with a feeding arrangement having two conveyor chain path sections which are parallel and horizontally adjacent. There is furthermore a requirement for a device which reliably renders the beaks of poultry using the feeding device harmless. A further aspect and an object of the invention are therefore directed toward permitting efficient feeding of working animals under said additional requirements.

This is made possible with the previously described design of a feeding arrangement. Unlike in the prior art, it is possible, in the case of this design, for two chain links which are coupled to one another to be coupled pivotably about a vertically oriented pivot axis, which permits the guiding of the conveyor chain in a horizontal plane and also permits the efficient use of an endless conveyor chain in such a horizontal guide plane. At the same time, unlike in the prior art, the entire surface of a chain link is not configured as an abrasive feed receiving region, but rather the chain link merely has an upwardly facing abrasive feed receiving region and consequently also has one or more non-abrasive surface regions. By this means, other upwardly facing surfaces of the chain link can be used to carry out a low-wear or wear-free guiding of the chain link in a holding-down device, which permits the deflection of a conveyor chain constructed by such chain links in a horizontal plane, i.e., about a vertical axis of deflection, using the pivotability of two chain links coupled to one another about a vertically oriented pivot axis.

In this aspect of the invention, it is particularly preferred if each chain link has a guide region which is arranged adjacent to the abrasive feed receiving region, is non-abrasive, and faces upward for the sliding guiding of the chain link in a hold-down-clamp guide device. According to this embodiment, a guide region, which is of non-abrasive design, is provided on the chain link which faces upward, and thereby provides the possibility of guidance by means of a holding-down-clamp guide device. This makes it possible in a simple manner to obtain a low-wear or wear-free guiding of the conveyor chain in a deflector in which the conveyor chain is deflected about a vertical deflection axis.

Even further, it is preferred here if each chain link has a triangular shape with a base and two limbs, wherein the coupling of two chain links takes place by coupling the base of a first chain link to a tip, formed by the limbs, of another chain link, and one or both limbs of a chain link have an upwardly facing surface which, in an outer surface region, is designed as a non-abrasive guide surface and, in an inner region, is designed as an abrasive feed receiving surface. According to this embodiment, the non-abrasive surface region, i.e., the surface region which is suitable for guiding in a hold-down-clamp guide device, lies on the outside of a chain link of substantially triangular configuration of the conveyor chain and can, therefore, be received and guided in a structurally more secure manner by a corresponding guide device without contact of the guide device with the abrasive region being able to occur here.

Even further, it is preferred if each chain link has a triangular shape with a base and two limbs, wherein the coupling of two chain links takes place by coupling the base of a first chain link to a tip, formed by the limbs, of another chain link, and one or both limbs of a chain link has an upwardly facing surface which, at least in an outer surface region, is designed as a non-abrasive guide surface, and the base has an upwardly facing surface which is designed as an abrasive feed receiving surface and is offset downward in the vertical direction in relation to the non-abrasive guide surface and is adjacent to the latter. According to this embodiment, an abrasive feed receiving region is also provided on a base of a substantially triangular chain element of a conveyor chain, said feed receiving region extending transversely with respect to the conveying direction to such an extent that it lies in alignment in the longitudinal direction of the conveyor chain with a non-abrasive guide region of the chain link. This arrangement is made possible here according to the invention not without wear of a guide element being caused here by the abrasive region on the base by the base running downward in the vertical direction in a staggered manner with respect to the guide region, i.e., the abrasive surface lying below the guide surface. This prevents a guide element which rests on the guide surface from coming into contact with the abrasive surface on the base of the chain link, and consequently the opposed requirements of firstly permitting secure and wear-free guidance of the chain link and secondly of providing a maximum amount of feed on abrasive surfaces of the chain link are ideally combined with one another.

Even further, it is preferred if the coupling between two adjacent chain links takes place by means of an eyelet on one chain link, said eyelet engaging around a web section on the other chain link, wherein the eyelet has an upper surface which is designed as a non-abrasive guide surface for the sliding guiding of the chain link in a hold-down-clamp guide device. According to this embodiment, the coupling between two chain links takes place by means of an eyelet and a chain link, in particular, by the eyelet being formed on the base or the point of a triangular chain link and the web being formed in a correspondingly converse manner on the point or on the base of the chain link, and, therefore, two identically constructed chain links can be directly coupled to each other via the web and the eyelet. In principle, it should be understood that the coupling of two adjacent chain links can be realized in such a manner that two adjacent chain links can thereby be coupled to each other, i.e., by eyelet and web being formed on each chain link. According to this development, the eyelet is provided with an upper surface which is of non-abrasive design. This makes it possible, for example, to use the surface of said eyelet for guiding in a hold-down device, and consequently of bringing about efficient holding down of the chain link.

Even further, it is preferred here if each chain link is punched out of a metal sheet. The production of the chain link from sheet metal in a punching operation firstly permits rapid and productive production of chain links and, secondly, on the one hand, the contour and, on the other hand, the deformation to form an eyelet, can be brought about by the punching operation in one or more working steps which correspond or are similar in terms of manufacturing.

In principle, such a production process also produces a burr which has proven advantageous for rendering a beak harmless. A burr should be understood here as meaning an overhang at the edge resulting from the punching operation, i.e., in the corner region between a surface and an edge surface of the metal sheet from which the contour has been punched.

It is furthermore particularly preferred if the edges of a chain link that are produced by the punching operation are sharp-edged or have a sharp-edged burr at least in sections. In principle, production of the chain links by a punching operation generally produces a sharp edge or a sharp-edged burr at the edges of the chain link. Said edge/said burr can be rendered harmless or removed by subsequent deburring. However, it has been shown that a sharp-edged burr or edge in the configuration according to the invention of the chain link is advantageous in order gently to render the beaks of poultry harmless and thereby takes on a natural function. It is not necessary here for all of the edges of the chain link that are produced by the punching operation to have such a burr. In particular, edge sections which also serve for guiding the chain link can be deburred, whereas other edge sections have a burr.

In particular, it is advantageous here if the burr of the chain link faces upward in that path section of the feed chain which is provided for receiving the feed, in order thereby to particularly effectively render beaks harmless.

Furthermore, it is preferred if the conveyor is formed from a plurality of chain links which are coupled to one another and are coupled to one another for pivoting of two chain links coupled to one another about a vertically oriented pivot axis, and in that each chain link is formed from a semi-finished plate product and has at least one edge between a surface section and an edge surface, wherein the edge is of sharp-edged design.

Sharp-edged is understood here as meaning, in particular, an edge which exerts an abrasive effect on the beaks of poultry, more precisely on the horn material of the beak. Within the context of ISO13715:2000-12, this can be an outer edge, the deviation of which from the ideal geometrical shape is approximately zero or which has an overhang (burr). An edge is advantageously considered to be sharp-edged that has an abrasion of no more than 0.05 mm and a burr of no more than 0.05 mm; a burr at the edge having an overhang of 0.1 mm or more is also advantageous for the abrasive or abrading effect according to the invention on the beaks of poultry.

Even further, it is preferred here if each chain link has a central recess. Such a central recess which can be designed, for example, as a continuous opening or as a depression in the chain link firstly permits the receiving of feed and secondly the enclosing thereof by the chain link and consequently efficient conveying of the feed along the conveying section.

Finally, it is provided, according to a further development of the feeding device with an abrasive surface on the chain links and vertical pivotability, to develop said feeding device in such a way as has been described previously for the feeding device with two parallel and horizontally spaced-apart path sections.

BRIEF DESCRIPTION OF THE DRAWINGS

Preferred embodiments of the invention will be described with reference to the attached figures, in which.

DETAILED DESCRIPTION OF THE EMBODIMENTS

Figure 1:
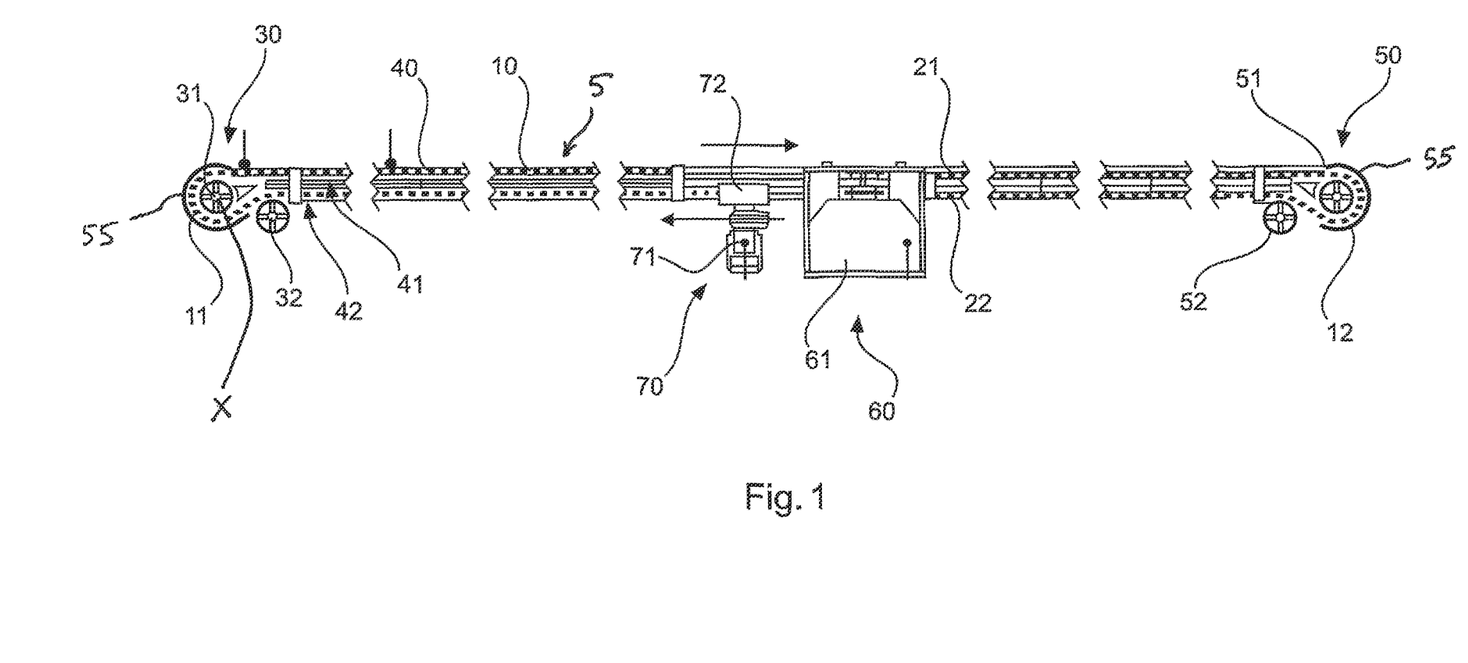
FIG. 1 shows a top view of an embodiment of the invention.
Figure 2:
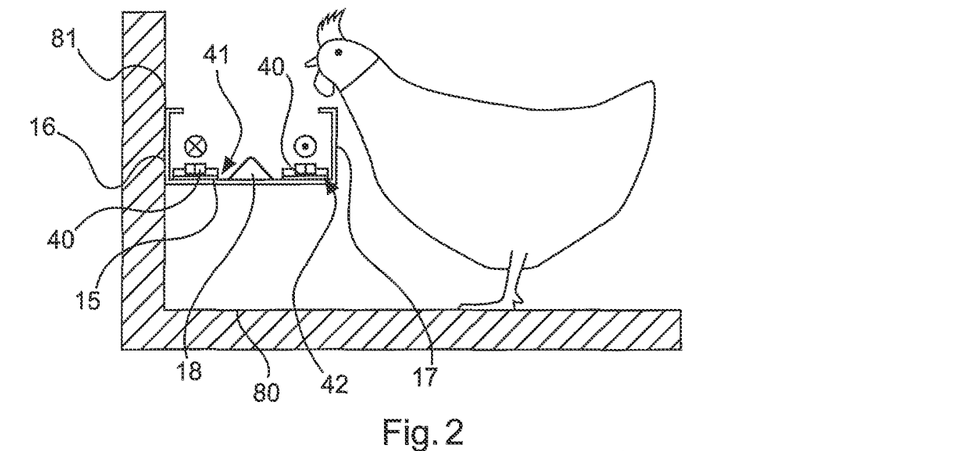
FIG. 2 shows a transversely sectioned longitudinal view of the embodiment according to FIG. 1.

With reference first of all to FIGS. 1 and 2, a feeding device according to the invention comprises a guide device 5 that may include a feed trough 10 which extends in a longitudinal direction and in which a first path section 21 of a conveyor chain 40 and a second path section 22 of the conveyor chain 40 run parallel to each other and horizontally spaced apart. The first and second path sections 21, 22 extend from a left end 11 of the feed trough to a right end 12 of the feed trough. A deflector 30 of the conveyor chain 40 is arranged at the left end 11. Said deflector 30 is realized by means of a first deflecting wheel 31 and a second deflecting wheel 32, whereby the conveyor chain 40 is deflected from the first path second 21 into the second path section 22 about a vertically oriented deflecting axis X, shown as normal to the plane shown in FIG. 1. The conveyor chain 40 encloses the first deflecting wheel 31 at an angle of approximately 210° and lies with an inner edge 41 of the conveyor chain 40 against said first deflecting wheel 31. By this means, the conveyor chain 40 runs out of the first path section 21 onto the deflecting wheel 31, is deflected by the deflecting wheel 31 by 210° and, upon being detached from the first deflecting wheel 31, thereby converges again with the first path section 21. From said direction converging toward the first path section 21, the conveyor chain 40 is deflected again by the second deflecting wheel 32 by approximately 30° in the opposite direction to the deflection in the deflecting wheel 31 in order, upon being detached from the second deflecting wheel 32, to run parallel to the first path section 21 into the second path section 22. The conveyor chain 40 is in contact here by an outer edge 42 with the second deflecting wheel 32.

At the opposite end of the path sections 21, 22, the conveyor chain 40 is deflected in a deflector 50, which is constructed in a correspondingly mirror-symmetrical manner with respect to the first deflector 30 and has a first deflecting wheel 51 and a second deflecting wheel 52.

Between the left and right deflectors 30, 50, a feed supply device 60 is arranged approximately centrally on the first and second path section 21, 22. The feed supply device 60 comprises a funnel-shaped feed container 61 into which granular feed can be filled and drops from there onto the conveyor chain 40 in the first and second path section 21, 22 in the region below the feed container. By this means, the feed is simultaneously applied to the conveyor chain 40 in the first and second path section 21, 22 and can thereby be conveyed simultaneously by the conveyor chain 40 in the first path section 21 in the direction of the right deflector 50 and in the second path section 22 in the direction of the left deflector 30.

A drive 70, which drives the conveyor chain 40, is arranged adjacent to the feed supply device 60. The drive 70 is formed by an electric motor 71 which is mechanically coupled to a drive wheel 72 which grips the conveyor chain 40 in a form-fitting manner.

FIG. 2 shows the feed device according to FIG. 1 in an installation situation on a working animal residence region for poultry. The feed trough 10 is arranged at a vertical spacing from the floor 80 of the residence region and can be fastened to a stall wall 81.

The feed trough 10 comprises a feed trough bottom 15 and two side walls 16, 17, the upper ends of which are angled inward over a short distance and thereby form an inwardly facing border which prevents the undesirable discharge of feed out of the feed trough 10.

In the path section 21, 22, the conveyor chain 40 runs parallel and horizontally spaced apart within the feed trough 10 and rests on the bottom of the feed trough 10. A cross-sectionally triangular elevation 18 with an upwardly pointing point is arranged between the path section 21 of the conveyor chain 40 and the path section 22 of the conveyor chain 40, said elevation 18 bringing about guidance and spacing of the conveyor chain 40 in the two path sections 21, 22.

Figure 3:
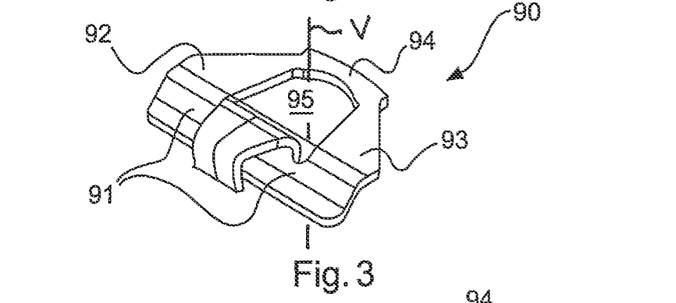
FIG. 3 shows a perspective view of a chain link for a conveyor chain of an embodiment of the invention.
Figure 4:
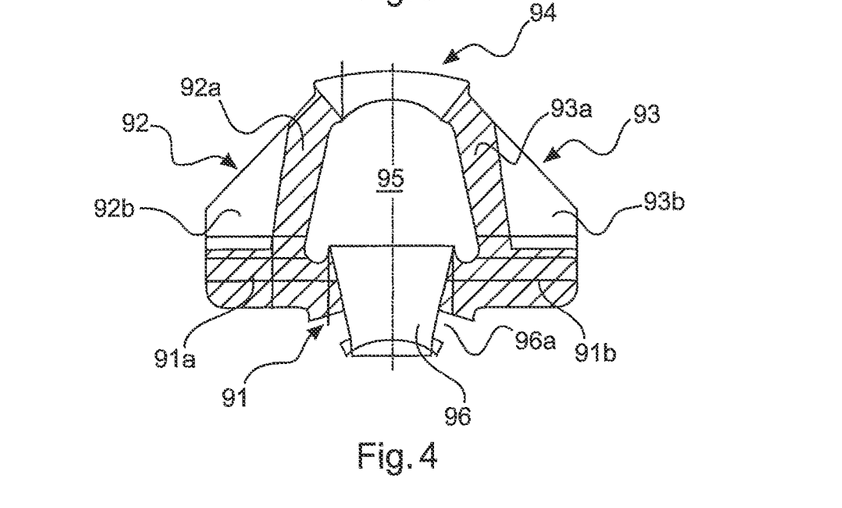
FIG. 4 shows a top view of a chain link according to FIG. 3.

FIGS. 3 and 4 show a chain link 90 of the conveyor chain 40. The chain link has a triangular shape and is formed from a base 91 and two limbs 92, 93 which meet at a rounded point 94. The base 91 and the limbs 92, 93 of the rounded point 94 enclose an opening or central recess 95. An eyelet 96 is formed on the base 91, said eyelet 96 being formed by deformation of material which is derived from the original starting plate material in the region of the opening 95.

The base 91 has a left abrasive region 91a and a right abrasive region 91b. The limbs 92, 93 each have an inner abrasive region 92a, 93a. A non-abrasive, smooth region 92b, 93b is formed adjacently on the outside of the limbs 92, 93. The rounded point 94 is likewise designed as a non-abrasive smooth region of the chain link 90.

The eyelet 96 is formed by a tab which is formed via the base 91 and forms an inner approximately elliptical cavity. Said tab has a slot-shaped opening 96a on the lower side of the chain link 90. Said opening 96a is formed by a distance between the angled end of the tab and the base 91, said distance being slightly larger than the sheet metal thickness of the rounded point 94. The rounded point 94 of a chain link can thereby be pushed in a vertical orientation with respect to another chain link through the gap into the eyelet 96 of said other chain link and, by pivoting by 90° into an orientation in which the surfaces of the two chain links run in alignment with each other, can be locked therein in the eyelet 96 of the other chain link. On account of a rounded shaping of the rounded point 94, both on the outer edge and also on the edge facing inward toward the opening 95, said connection between the rounded point 94 of a chain link and the eyelet 96 of another chain link can be pivoted relative each other and thereby permits the deflection of a conveyor chain 40, which is formed by chain links 90, about a vertical deflecting axis V.

The non-abrasive smooth guide surfaces 92b, 93b and the smooth non-abrasive guide surface on the eyelet 96 serve, during such a deflection, to be guided in sliding contact by means of a hold-down clamp 55 extending over the deflectors 30, 50 and thereby to hold the chain link in the horizontal orientation when said chain link runs through a deflector, such as, for example, a deflector 30 or 50.

The invention claimed is:

1. A feeding device for working animals, comprising:
a conveyor having a plurality of receiving regions for a feed, the receiving regions being arranged along the conveyor chain and being accessible from above by the working animals;
a feed supply device for supplying feed to the receiving regions; and
a guide device for guiding the conveyor along a predetermined path;
wherein the guide device guides the conveyor in a first path section of the predetermined path parallel and in a horizontal direction adjacent to a second path section of the predetermined path, and wherein the conveyor is guided in the first path section in a first conveying direction which is opposed to a second conveying direction in which the conveyor is guided in the second path section;
wherein the first and the second path section extend over at least part of their adjacent and parallel course to a first deflector, the first deflector deflecting the conveyor by 180° and comprising a first deflecting element which is encircled by the conveyor over a circumferential angle of at least 180°;
wherein in the first and second path section, an inner edge of the conveyor runs in mutually adjacent form in the first path section and the second path section and the first deflecting element lies against the inner edge of the conveyor; and
wherein the conveyor is formed from a plurality of chain links which are coupled to one another to form a horizontal receiving surface for the feed and are coupled to one another for pivoting of two chain links coupled to one another about a vertically oriented pivot axis, wherein each chain link has an upwardly facing abrasive feed receiving region for receiving feed, and each chain link has a guide region which is arranged adjacent to the abrasive feed receiving region that is non-abrasive and faces upward for the sliding guiding of the chain link in a hold-down-clamp guide device.

2. The feeding device of claim 1, wherein the conveyor is an endless conveyor.

3. The feeding device of claim 1, wherein the feed supply device is designed to supply feed simultaneously into the receiving regions of the conveyor in the first and in the second path section.

4. The feeding device of claim 3, wherein the feed supply device extends over the first and the second path section.

5. The feeding device of claim 1, wherein the first and the second path section extend over at least part of their adjacent and parallel course to a second deflector which is designed for deflecting the conveying direction of the conveyor by 180°.

6. The feeding device of claim 1, wherein the first deflector has a second deflecting element which lies against an outer edge opposite the inner edge and deflects the conveyor to an adjacent course at a distance which is smaller than the diameter of the circle which the inner edge of the conveyor passes through in the encircling of the first deflecting element.

7. The feeding device of claim 6, wherein the first and the second path section extend over at least part of their adjacent and parallel course to a second deflector which is designed for deflecting the conveying direction of the conveyor by 180°, the second deflector being designed in accordance with the first deflector.

8. The feeding device of claim 1, wherein the conveyor is arranged and designed in the first and second path section for the removal of feed by the working animal.

9. The feeding device of claim 1, wherein the conveyor is deflected from the first path section into the second path section about a vertically oriented deflecting axis.

10. The feeding device of claim 1, wherein the guide device is formed by a feed trough which extends along the first and second path section and encloses the first and second path section at the bottom and laterally, wherein the feed trough preferably extends along the entire course of the conveyor.

11. The feeding device of claim 10, wherein the feed trough has an elevation which is arranged between the first and the second path section and extends along the path sections.

12. The feeding device of claim 11, wherein the elevation is formed by a deformation of a bottom section of the feed trough.

13. The feeding device of claim 1, wherein each chain link has a triangular shape with a base and two limbs, and wherein the coupling of two chain links takes place by coupling the base of a first chain link to a tip, formed by the limbs, of another chain link, and one or both limbs of a chain link have an upwardly facing surface which, in an outer surface region, is designed as a non-abrasive guide surface and, in an inner region, is designed as an abrasive feed receiving surface.

14. The feeding device of claim 1, wherein each chain link has a triangular shape with a base and two limbs, and wherein the coupling of two chain links takes place by coupling the base of a first chain link to a tip, formed by the limbs, of another chain link, and one or both limbs of a chain link has an upwardly facing surface which, at least in an outer surface region, is designed as a non-abrasive guide surface, and the base has an upwardly facing surface which is designed as an abrasive feed receiving surface and is offset downward in the vertical direction in relation to the non-abrasive guide surface and is adjacent to the latter.

15. The feeding device of claim 1, wherein the coupling between two adjacent chain links takes place by means of an eyelet on one chain link, said eyelet engaging around a web section on the other chain link, wherein the eyelet has an upper surface which is designed as a non-abrasive guide surface for the sliding guiding of the chain link in a hold-down-clamp guide device.

16. The feeding device of claim 1, wherein the conveyor is formed from a plurality of chain links which are coupled to one another for pivoting of two chain links coupled to one another about a vertically oriented pivot axis, and each chain link is punched out of a metal sheet.

17. The feeding device as claimed in claim 16, wherein the edges of a chain link are produced by a punching operation and have a sharp-edged burr at least in sections.

18. The feeding device of claim 1, wherein the conveyor is formed from a plurality of chain links which are coupled to one another for pivoting of two chain links coupled to one another about a vertically oriented pivot axis, and in that each chain link is formed from a semi-finished plate product and has at least one edge between a surface section and an edge surface, wherein the edge is of sharp-edged design.

19. The feeding device as claimed in claim 1, wherein each chain link has a central recess.

20. A feeding device for working animals, comprising:
a conveyor having a plurality of receiving regions for a feed, the receiving regions being arranged along the conveyor chain and being accessible from above by the working animals;
a feed supply device for supplying feed to the receiving regions; and
a guide device for guiding the conveyor along a predetermined path;
wherein the guide device guides the conveyor in a first path section of the predetermined path parallel and in a horizontal direction mutually adjacent to a second path section of the predetermined path, and wherein the conveyor is guided in the first path section in a first conveying direction which is opposed to a second conveying direction in which the conveyor is guided in the second path section;
wherein the first and the second path section extend over at least part of their adjacent and parallel course to a first deflector which is designed for deflecting the conveyor by 180° and the first and the second path section extend over at least part of their adjacent and parallel course to a second deflector which is designed for deflecting the conveyor by 180°;
wherein in the first and second path section, an inner edge of the conveyor runs in mutually adjacent form in the first path second and the second path section and a first deflecting element and a second deflecting elements, respectively, lie against the inner edge of the conveyor; and
wherein each of the first and second deflectors, respectively, have an additional deflecting element which lies against an outer edge opposite the inner edge and deflects the conveyor to an adjacent course at a distance which is smaller than the diameter of the circle which the inner edge of the conveyor passes through in the encircling of the first and second deflecting elements.

21. A feeding device for working animals, comprising:
a conveyor having a plurality of receiving regions for a feed, the receiving regions being arranged along the conveyor chain and being accessible from above by the working animals;
a feed supply device for supplying feed to the receiving regions; and
a guide device for guiding the conveyor along a predetermined path, wherein the guide device guides the conveyor in a first path section of the predetermined path parallel and in a horizontal direction adjacent to a second path section of the predetermined path, wherein the guide device is formed by a feed trough which extends along the first and second path section and encloses the first and second path section at the bottom and laterally, wherein the feed trough extends along the entire course of the conveyor and further comprises an elevation formed by a deformation of a bottom section of the feed trough and arranged between the first and the second path section that extends along the path sections;
wherein the conveyor is guided in the first path section in a first conveying direction which is opposed to a second conveying direction in which the conveyor is guided in the second path section, the conveyor being formed from a plurality of chain links coupled to one another at a coupling, forming a horizontal receiving surface for the feed, and are coupled to one another for pivoting of two chain links coupled to one another about a vertically oriented pivot axis, wherein each chain link has an upwardly facing abrasive feed receiving region for receiving feed.

* * * * *